(12) United States Patent
Bhagavatula et al.

(10) Patent No.: US 10,052,692 B2
(45) Date of Patent: Aug. 21, 2018

(54) ONE POT PROCESS FOR THE PREPARATION OF ULTRA-SMALL SIZE TRANSITION METAL NANOPARTICLES

(71) Applicant: Council of Scientific & Industrial Research, New Delhi (IN)

(72) Inventors: Prasad Lakshmi Vara Bhagavatula, Maharashtra (IN); Jhumur Seth, Maharashtra (IN)

(73) Assignee: Council of Scientific & Industrial Research, New Dehli (IN)

( * ) Notice: Subject to any disclaimer, the term of this patent is extended or adjusted under 35 U.S.C. 154(b) by 154 days.

(21) Appl. No.: 14/420,897

(22) PCT Filed: Aug. 12, 2013

(86) PCT No.: PCT/IN2013/000492
§ 371 (c)(1),
(2) Date: Feb. 10, 2015

(87) PCT Pub. No.: WO2014/027367
PCT Pub. Date: Feb. 20, 2014

(65) Prior Publication Data
US 2015/0183028 A1    Jul. 2, 2015

(30) Foreign Application Priority Data
Aug. 11, 2012  (IN) ............... 1790/DEL/2012

(51) Int. Cl.
*B22F 9/24* (2006.01)
*B22F 1/00* (2006.01)
(Continued)

(52) U.S. Cl.
CPC ............ *B22F 9/24* (2013.01); *B01J 23/42* (2013.01); *B01J 23/44* (2013.01); *B01J 23/462* (2013.01); *B01J 23/464* (2013.01); *B01J 23/50* (2013.01); *B01J 35/026* (2013.01); *B01J 37/16* (2013.01); *B22F 1/0011* (2013.01); *B22F 1/0018* (2013.01); *B82Y 30/00* (2013.01); *B22F 2009/245* (2013.01)

(58) Field of Classification Search
None
See application file for complete search history.

(56) References Cited

U.S. PATENT DOCUMENTS 5,147,841 A  *  9/1992  Wilcoxon  ............ B01J 13/0026
                                            502/173
6,103,868 A  *  8/2000  Heath  ...................... C30B 7/00
                                            427/212
(Continued)

OTHER PUBLICATIONS

Brust, M. et al. 1994 "Synthesis of thiol-derivatised gold nanoparticles in a two-phase liquid-liquid system" *J CHEM SOC, CHEM COMMUN*; 801-802.
(Continued)

*Primary Examiner* — George Wyszomierski
(74) *Attorney, Agent, or Firm* — Knobbe, Martens, Olson & Bear, LLP (57) ABSTRACT

Disclosed is a one pot process for the synthesis of ultra-small uniform-sized (1-3 nm) transition metal nanoparticles with shape tunability. These nanoparticles have uses in various fields, including catalysis and fuel cells.

11 Claims, 5 Drawing Sheets

(51) Int. Cl.
*B82Y 30/00* (2011.01)
*B01J 23/42* (2006.01)
*B01J 23/44* (2006.01)
*B01J 23/46* (2006.01)
*B01J 23/50* (2006.01)
*B01J 35/02* (2006.01)
*B01J 37/16* (2006.01)

(56) References Cited

U.S. PATENT DOCUMENTS

| | | |
|---|---|---|
| 6,572,673 B2 | 6/2003 | Lee et al. |
| 7,160,525 B1 | 1/2007 | Peng et al. |
| 2003/0072874 A1* | 4/2003 | Klabunde ............ B01J 13/0043 427/216 |
| 2005/0235776 A1 | 10/2005 | He et al. |
| 2006/0154380 A1* | 7/2006 | Egusa .................. B22F 1/0018 438/1 |
| 2006/0254387 A1* | 11/2006 | Lee ...................... B22F 1/0018 75/252 |
| 2007/0151631 A1* | 7/2007 | Fernandez Camacho ................. A61K 41/0052 148/300 |
| 2011/0048170 A1* | 3/2011 | Bhatia .................. B22F 1/0025 75/330 |
| 2012/0283336 A1* | 11/2012 | Grigorenko ........... B22F 1/0022 514/769 |
| 2014/0308537 A1* | 10/2014 | Cho ...................... B22F 1/0051 428/570 |

OTHER PUBLICATIONS

Sahu, P. et al. 2012 "Effect of digestive ripening agent on nanoparticle size in the digestive ripening process" *Chemical Physics Letters* 525-526:101-104.

Seth, J. et al. 2016 "Bromide ion mediated modification to digestive ripening process: Preparation of ultra-small Pd, Pt, Rh and Ru nanoparticles" *Nano Research* 9: (in 11 pages).

Sahu, P., and B.L.V. Prasad, Time and Temperature Effects on the Digestive Ripening of Gold Nanoparticles: Is There a Crossover From Digestive Ripening to Ostwald Ripening? Langmuir 30:10143-10150, 2014.

Stoeva, S.I., et al., Reversible Transformations of Gold Nanoparticle Morphology, Langmuir 21:10280-10283, 2005.

* cited by examiner

ONE POT PROCESS FOR THE PREPARATION OF ULTRA-SMALL SIZE TRANSITION METAL NANOPARTICLES

TECHNICAL FIELD OF THE INVENTION

Present invention provides one pot process for synthesis of ultra-small, uniform-sized (1-3 nm) transition metal nanoparticles with the shape tunability. More particularly, present invention provides transition metal nanoparticles useful in various fields like catalysis, fuel cells etc.

BACKGROUND AND PRIOR ART OF THE INVENTION

Recently, an organic reaction catalyzed by metal/metal oxide nanoparticles (NPs) has attracted much attention. The remarkable advantages of this family of heterogeneous catalysts, such as high catalytic activity with improved selectivity and good recyclability, extend its use to a wide-range of applications in various organic reactions.

Metal-oxide nanoparticles such as $TiO_2$ and ZnO, serve many functions in polymeric industry. Traditionally, theses nanoparticles have been used as pigments to increase the appearance and durability of polymeric products. As nano-sized particles, of these materials exhibit broad band UV absorption, the use of the same is extended to cosmetic applications.

In view of the significance, metal-oxide/metal nanoparticles are also useful for a large variety of more sophisticated applications including use in catalysis, as sensors, optoelectronic materials and in environmental remediation.

The conventional prior art preparation techniques for Metal oxides (MOx) NPs typically use organometallic precursors to form NPs with diameters greater than 2 nm. With the prior art methodology, only larger structures such as nanorods, nanotubes, nanoneedles, and nanowires have been reported in literature.

Further to dissolve the metal precursor surfactant is employed in the art, couple of the metal-surfactant complex is disclosed herein below.

KR100967708 (BAEK et al.) discloses a process for producing metal oxide nano-particles; wherein the process comprises, adding of a surfactant to a dispersing organic solvent and mixing to prepare a surfactant solution; mixing the surfactant solution and a metal salt water solution to prepare a first oil-in-water type emulsion, wherein the metal of the metal salt is selected from iron, cobalt, nickel, and chromium; mixing the surfactant solution and a basic solution to prepare a second oil-in-water type emulsion, mixing the first and the second oil-in-water emulsions to prepare a metal oxide nano-particle colloid solution by reacting the metal salt and the basic solution.

U.S. Pat. No. 7,407,527 (Hyeon Taeghwan et al.) discloses a method for producing metal or metal alloy nanoparticles, comprising the steps of; forming a metal-surfactant complex by reacting a metal precursor and a surfactant in a solvent, further synthesizing monodisperse metal nanoparticles by thermally decomposing. Similarly U.S. Pat. No. 6,572,673 discloses a process for preparing metal nanoparticles, comprising reacting suitable metal salts and anionic surfactant containing an anionic group of carboxylic group sulfate group or sulfonate group as reducing agent in water under reflux at a temperature of 50-140° C. followed by reduction to afford nanoparticles.

Additionally, the preparation of monodiprese metal nanoparticles by polyol method is reported in US 20070056402 (Cho Sung-Nam Et Al.), and article like Nanostructured Materials 11 (8), November 1999, Pg. 1277-84; and U.P.B. Sci. Bull (D Berger), series b, vol. 72, iss. 1, 2010. However in polyol method the morphology and dimension of metal nanoparticles is strongly depend on reaction condition, which leads to irregularity in shape.

Mathias Brust et al., in J. Chem. Soc., Chem. Commun., 1994, 801-802 discloses synthesis of thiol-derivatised gold nanoparticles by two-phase (water-toluene); wherein $AuCl_4^-$ was transferred from aqueous solution to toluene using tetraoctylammonium bromide as the phase-transfer reagent and reduced with aqueous sodium borohydride in the presence of dodecanethiol to obtain solutions of 1-3 nm gold particles bearing a surface coating of thiol.

However, use of phase transfer, cannot be standardized across metals where monodispersibility of metal may get affected.

WO2012009070 discloses a method of making ultra small metal oxide nanoparticles by placing water soluble, inorganic ammonium oxometalate precursor in a reactor; adding an excess of amine surfactant to said reactor, optionally adding diols or amine oxides to said reactor; heating the reactor until the ammonium oxometalate precursor structure collapses and the nucleation stage generates ultrasmall metal oxide nanoparticles of average size<5 nm.

Researchers have attempted to prepare metal nanoparticles by different methods. One such method includes reduction of palladium salt in a solution in situ in presence of a reducing agent such as easily oxidized alcohols and a stabilizing agent such as PVP to obtain PVP-Pd nanoparticles. Use of such stabilizing agents prevents the agglomeration of the nanoparticles. (CHEM 7530/750, WINTER by Olivier Nguon).

Deshmukh and co-workers carried out the Heck reaction using $Pd(OAc)_2$ and $PdCl_2$ catalysts in 1,3-dibutylimidazolium bromide {[BBIm][Br]} IL under ultrasonic irradiation conditions and reported the formation of 20 nm Pd nanoparticles composed of 1 nm nanoclusters formed via reduction of $Pd^{2+}$ ions during catalytic reaction. Since ionic liquids are expensive, use of the same escalates the cost of the process.

References may be made to patent U.S. Pat. No. 6,572,673, wherein nanoparticle synthesis and the size control is achieved by adjusting the rate of reduction. This has done by using appropriate reducing agents, nature of surfactants and/or the concentration of surfactants, temperature, rate of addition, cleanliness of glass ware, amount of reagents used, volume of the vessel etc. Any small change in any of the conditions listed above leads to the formation of larger particles or broader size distributions. In our procedure we will not face this problem as we start with a poly disperse system and CONVERT that to a mono disperse system.

A cursory review of the prior art reveals that there is no report for the synthesis of transition metal nanoparticles of small sizes (2-3 nm) in organic medium. Thus there is a need to provide a robust process for the preparation of transition metal nanoparticles that can be easier for industrial scale up.

In accordance with the need the present inventor has developed one pot process for the preparation of ultra-small uniform sized metal nanoparticles exhibit better catalytic activity and shape tunabillity.

OBJECT OF THE INVENTION

Main object of the present invention is to develop one pot process where metal nano particles can be achieved in ultra-small, uniform size.

Another object of the present invention is to provide one pot process for synthesis of ultra-small, uniform-sized (1-3 nm) transition metal nanoparticles with the shape tunability. Yet another object of the present invention is to provide transition metal nanoparticles useful in various fields like catalysis, fuel cells etc.

SUMMARY OF THE INVENTION

Accordingly, present invention provides a one-pot process for the synthesis of ultra-small, uniform-sized transition metal nanoparticles having size in the range of 1 to 3 nm and the said process comprising the steps of:
  a) dissolving metal precursors and surfactant in 1:2.5 ratio in organic solvent till complete dissolution;
  b) adding 9.4M reducing agent to the solution as obtained in step (a);
  c) adding capping agent in solution as obtained in step (b) with continuous stirring wherein the ratio of metal to capping agent is in the range of 1:10 to 1:40 followed by refluxing at temperature in the range of 70 to 130° C.;
  d) cooling the solution as obtained in step (c) at temperature in the range of 27-32° C. followed by adding anti-solvent to precipitate the ultra-small uniform-sized transition metal nanoparticles.

In an embodiment of the present invention, metal precursors used are selected from the group consisting of chlorides, bromides, nitrates, and acetates salts of transition metals selected from the group consisting of Platinum (Pt), Palladium (Pd), Rhodium (Rh), Iridium (Ir), Osmium (Os), Ruthenium (Ru), Silver (Ag), Gold (Au) either alone or in combinations thereof or alloy thereof.

In another embodiment of the present invention, the metal precursor used is selected from the group consisting of Rhodium acetate dimer, Palladium acetate, Platinum chloride, Ruthenium chloride, and Silver nitrate.

In yet another embodiment of the present invention, the surfactant used is Di-dodecyl dimethyl ammonium bromide (DDAB).

In yet another embodiment of the present invention, the organic solvent medium comprises an organic solvent or optionally with water, where the organic solvent is selected from the group consisting of toluene, benzene, chlorobenzene; preferable solvent is toluene.

In yet another embodiment of the present invention, the reducing agent used is sodium borohydride.

In yet another embodiment of the present invention, the capping agent used is di-dodecyl thiol.

The one pot process according to claim 1, wherein the anti-solvent used is selected from the group consisting of methanol, ethanol, isopropanol either alone or in combinations thereof, preferably ethanol.

In yet another embodiment of the present invention, the ultra-small uniform sized metal nanoparticles are optionally in the form of nanorods.

In yet another embodiment of the present invention, the ultra-small uniform sized metal nanoparticles exhibit better catalytic activity and shape tunabillity are useful in selective hydrogenation or reduction of large organic molecule or natural product synthesis.

DETAILED DESCRIPTION OF THE INVENTION

Figure 1:
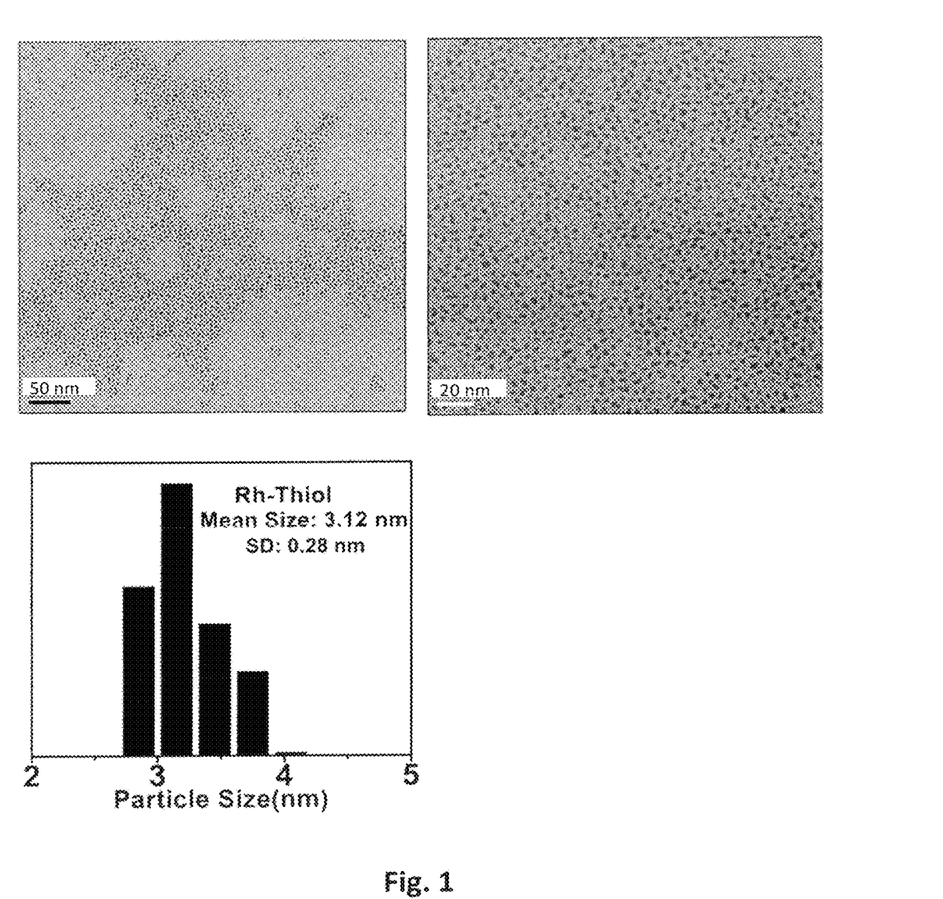
FIG. 1 shows TEM images of Rh-thiol NP (Nanoparticles), wherein, in the scale of the TEM image 50 nm=1 cm, if we draw a line on each nanoparticle it will be 0.6 mm, therefore each nanoparticle of approximately 0.6 mm=3.12 nm.
Figure 2:
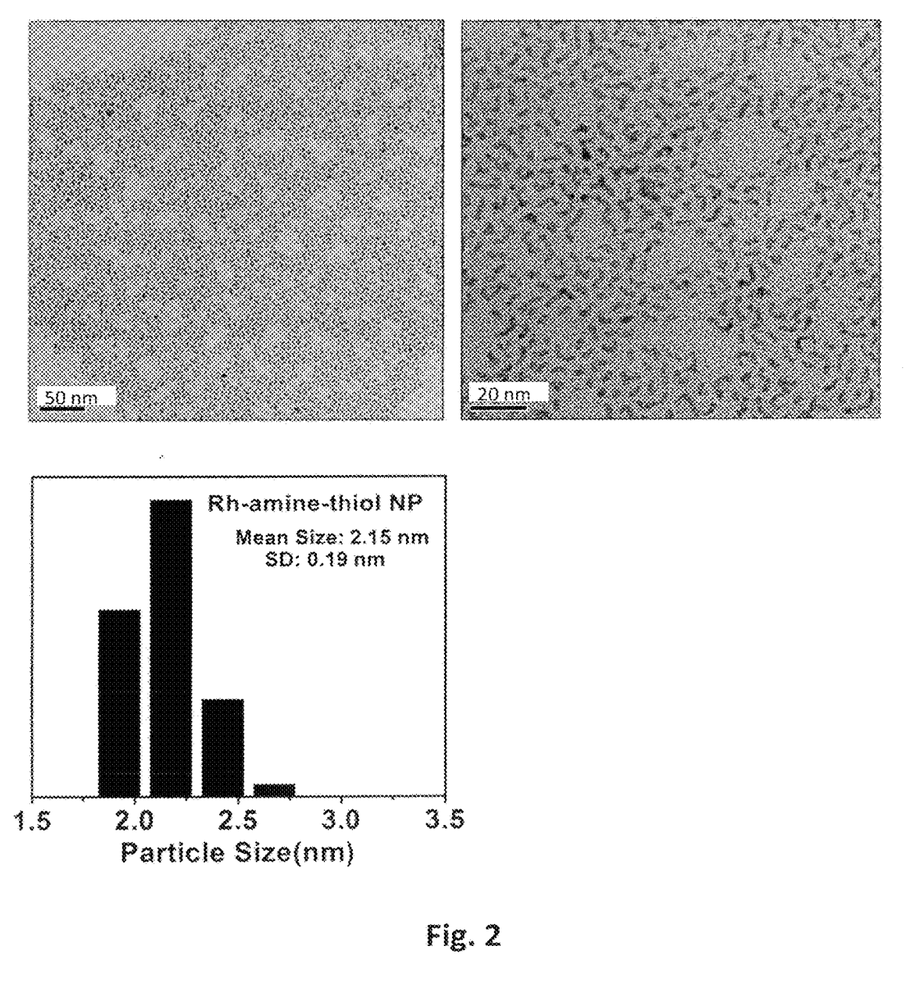
FIG. 2 shows TEM images of amine and thiol capped Rh-NP, wherein, in the scale of the TEM image 50 nm=1 cm, if we draw a line on each nanoparticle it will be 0.5 mm, therefore each nanoparticle of approximately 0.6 mm=2.15 nm.
Figure 3:
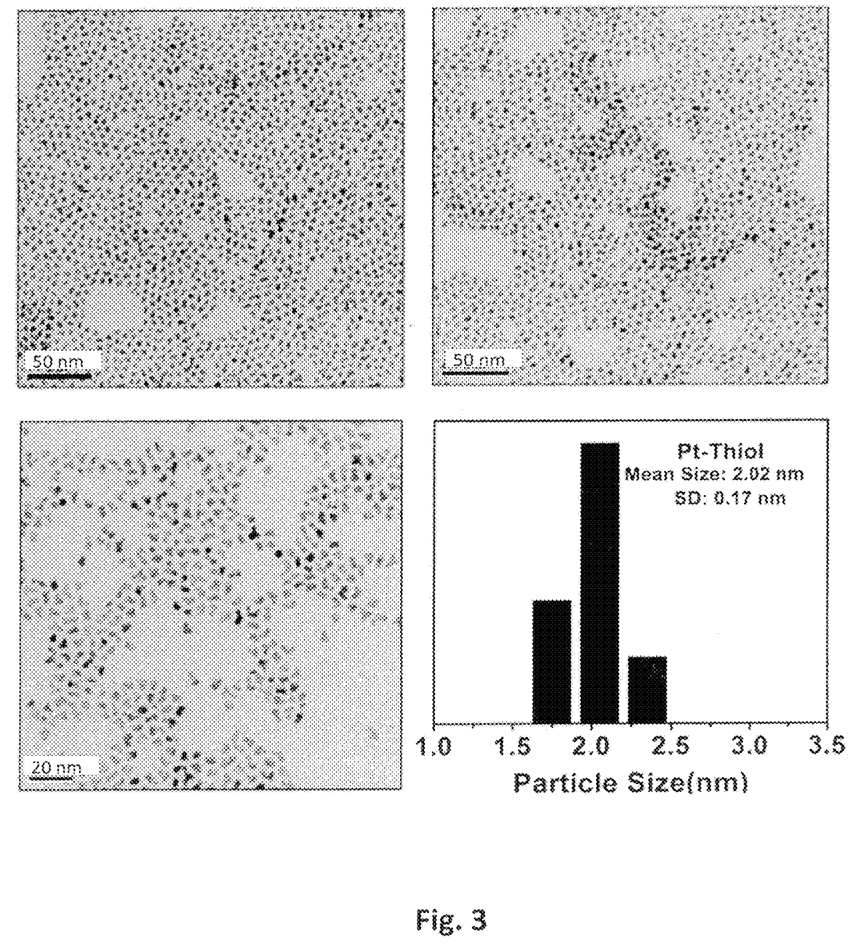
FIG. 3 depicts TEM images of Pt-thiol NP, wherein in the scale of the TEM image 50 nm=1 cm, if we draw a line on each nanoparticle it will be 0.5 mm, therefore each nanoparticle of approximately 0.6 mm=2.019 nm.
Figure 4:
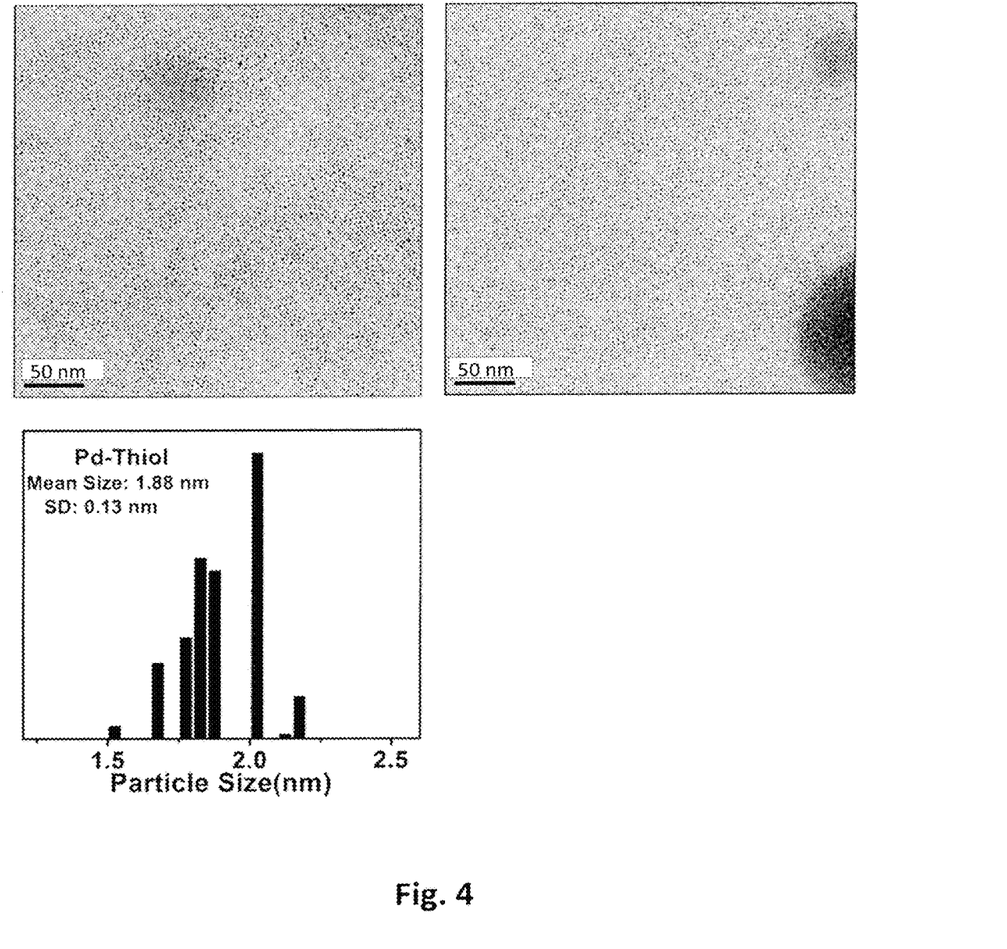
FIG. 4 depicts TEM images of Pd-thiol NP, wherein in the scale of the TEM image 50 nm=1 cm, if we draw a line on each nanoparticle it will be 0.4 mm, therefore each nanoparticle of approximately 0.6 mm=1.886 nm.
Figure 5:
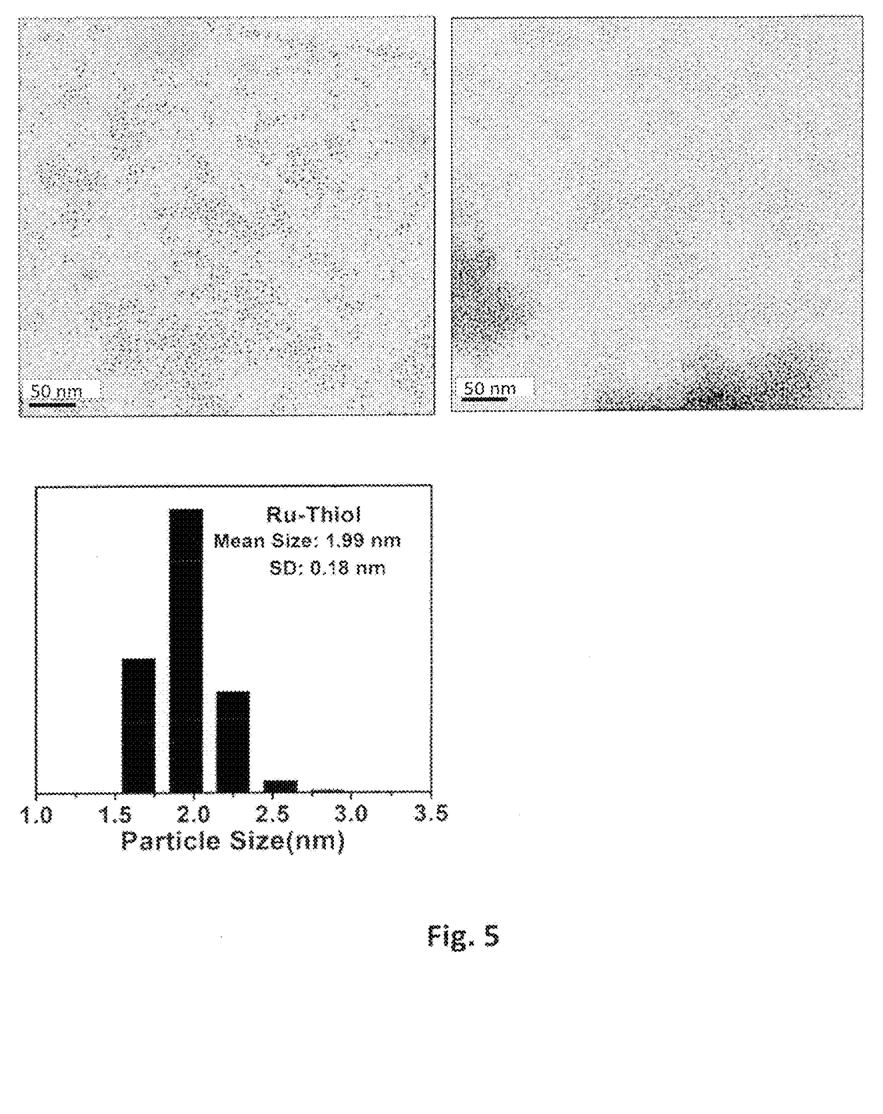
FIG. 5 shows TEM images of Ru-thiol NP, wherein in the scale of the TEM image 50 nm=1 cm, if we draw a line on each nanoparticle it will be 0.4 mm, therefore each nanoparticle of approximately 0.6 mm=1.99 nm.

The present invention provides one pot process for the synthesis of ultra-small, uniform-sized transition metal nanoparticles in organic medium using a reducing agent, capping agents and surfactants. The process according to the invention is short, simple and unique.

Further the ultra-small, uniform, nano-sized transition metal structure is selected from the group consisting of nanoparticles or nanorods, wherein the diameter of nanoparticles obtained is in the range of 1 to 3 nm. The ultra-small uniform sized metal nanoparticles can be also obtained in the form of nanorods.

Further, the synthesized ultra small sized transition metal nanoparticles/nanorods are useful as catalyst for selective hydrogenation, as sensors, optoelectronic materials, and in environmental remediation.

The invention provides one pot process for the synthesis of ultra-small, uniform-sized transition metal nanoparticles comprising;
  a) dissolving metal precursors and surfactant in organic solvent medium;
  b) adding reducing agent to the solution of step a), at a time when whole metal precursor is dissolved;
  c) adding capping agent to the mixture of step b) with continuous stirring followed by refluxing; and
  d) cooling the step c) solution to room temperature (25-32° C.), followed by adding anti-solvent to precipitate the ultra-small size nanoparticles.

Further the obtained ultra-small, uniform-sized metal nanoparticles having catalytic activity and better shape tunabillity or modification property.

The schematic diagram of the process for the synthesis of transition metal nanoparticles or nanorods is represented herein below.

According to the invention, the transition metal is selected from the group consisting of Platinum (Pt), Palladium (Pd), Rhodium (Rh), Iridium (Ir), Osmium (Os), Ruthenium(Ru), Silver (Ag), Gold (Au) either alone or in combinations thereof or alloy thereof.

The metal precursors are selected from chlorides, bromides, nitrates, acetates salts of transition metals. Metal precursor used according to the invention is Rhodium acetate dimer, Palladium acetate, Platinum chloride and Ruthenium chloride, Silver nitrate for the synthesis of Rh—NP, Pd—NP, Pt—NP and Ru—NP, Ag—NR (Nanorods) respectively. Moreover the process is independent of metal.

Further the surfactants may be selected from fatty amine surfactants such as di-dodecyl amine; Di-dodecyl dimethyl ammonium bromide (DDAB) etc.

The organic solvent medium according to the invention comprises an organic solvent or optionally with water. The organic solvent is selected from the group consisting of toluene, benzene, chlorobenzene, etc. one preferable solvent is toluene. The synthesized nanoparticles are stable in organic medium and can also be obtained in the form of powder. This powder can then be redispersed at any time in non-polar organic solvent such as toluene.

The reducing agent for the purpose of the invention may be conveniently selected from Sodium borohydride, Lithium Aluminum hydride, preferably sodium-borohydride.

The capping agent is selected from alkane thiols such as Di-dodecyl thiol. The ratio of metal to capping agent may be in the range of 1:10 to 1:40. The capping agent is also referred as "ligand" in the current specification.

The anti-solvent involved in the invention is selected from the group consisting of methanol, ethanol, isopropanol either alone or combination thereof, preferably ethanol.

Further the process is carried out at refluxing temperature of the solvent used, generally in the range of 70° to 130° C., preferably temperature is in the range of 80° C. to 120° C.

Platinum nanoparticles (Pt NP) are prepared by selecting Platinum (II) Chloride as a metal precursor. Accordingly, to synthesis Pt NP, PtCl2 and Di-dodecyl dimethyl ammonium bromide (DDAB) have been taken in degassed toluene and stirred to dissolve the metal precursor in the organic solvent (toluene). Sodium borohydride solution is added at a time when the whole metal precursor becomes soluble in toluene. An immediate color change was occurred from brownish yellow to black. This mixture is stirred for 30 minutes followed with addition of Di-dodecyl thiol and stirred the mixture for another 10 minutes. The ratio of metal and capping agent is 1:30. Then this mixture is refluxed at 80° C. for one hour and the solution is allowed to cool at room temperature (25-32° C.). Excess ethanol is added to it for precipitation and kept same for 12-14 hours. After complete precipitation of metal nanoparticle, the upper ethanol portion is decanted. The metal nanoparticles thus obtained are washed with ethanol by centrifuging at 12,000 rpm for 20 minutes each time and dried at open air to collect as a powder.

In a similar manner, other transition metal nanoparticles are prepared by selecting appropriate metal precursors according to the process of the present invention.

In an another embodiment the synthesized transition metal nanoparticles or nanorods exhibit better catalytic activity and shape tunabillity, whereas the shape tunabillity is depend on the ratio of capping agent to surfactant.

The synthesized transition metal nanoparticles are used in catalysis, as sensors, optoelectronic materials, and in environmental remediation.

The selectivity in the hydrogenation reaction is very much useful the in the synthesis of large organic molecules, natural products, to reduce multiple steps.

Accordingly the synthesized ultra small uniform sized metal nanoparticles are used as a catalyst in the selective alkyne hydrogenation reactions, wherein the terminal alkyne group is reduced without affecting the other groups or substituents of the same moiety.

Advantageously, the instant process is independent of metal. The process is mainly carried at ambient temperature, subsequent refluxing of all reagents together facile the process to get desired ultra small metal nanoparticles. Further the instant process obviates the cumbersome steps of separation and centrifugation to obtain uniform sized metal nanoparticles during the process. The synthesized ultra small metal nanoparticles/nanorods exhibit better catalytic activity and shape tunabillity, which is useful in the field of catalysis and fuel cell etc.

EXAMPLES

Following examples are given by way of illustration therefore should not be construed to limit the scope of the invention.

Example 1

Preparation of Platinum Nanoparticle (Pt NP)

Platinum (II) Chloride was used as a metal precursor to synthesis Pt NP. 0.013 gm Pt Cl$_2$ ($1\times10^{-2}$ M) and 0.053 gm Di-dodecyl dimethyl ammonium bromide (DDAB) (0.025 M) was taken in 5 mL degassed toluene. This mixture was stirred to dissolve the metal precursor in the organic solvent (toluene). Sodium borohydride solution (0.09 gm in 250 microlitre, 9.4 M) was added at a time when the whole metal precursor became soluble in toluene. An immediate color change was occurred from brownish yellow to black. This mixture was stirred for 30 minutes. Then 360 microlitre Di-dodecyl thiol was added to the mixture and it was allowed to stir another 10 minutes. The ratio of metal and capping agent was 1:30. Then this mixture was refluxed at 80° C. for one hour. Now, this solution was allowed to cool at 25° C. Excess ethanol was added to it for precipitation. It was kept for 14 hours. After complete precipitation of metal nanoparticle, the upper ethanol portion was decanted. The metal nanoparticle was washed with ethanol for 4 times by centrifuging at 12,000 rpm for 20 minutes each time. Then it was dried at open air and collected as a powder. This Pt NP powder can be dispersed in toluene or other nonpolar organic solvent. The particles are same as it was synthesized in toluene having 1-3 nm size.

Example 2

Preparation of Palladium Nanoparticle (Pd NP)

Palladium (II) Chloride was used as a metal precursor to synthesis Pd NP. 0.009 gm PdCl$_2$ ($1\times10^{-2}$ M) and 0.053 gm Di-dodecyl dimethyl ammonium bromide (DDAB) (0.025 M) was taken in 5 mL degassed toluene. This mixture was stirred to dissolve the metal precursor in the organic solvent (toluene). Sodium borohydride solution (0.09 gm in 250 microlitres, 9.4 M) was added at a time when the whole metal precursor becomes soluble in toluene. An immediate color change was occurred from brownish yellow to black. This mixture was stirred for 30 minutes. Then 360 microlitre Di-dodecyl thiol was added to the mixture and allowed to stir another 10 minutes. The ratio of metal and capping agent was 1:30. Then this mixture was refluxed at 80° C. for one hour. Now, this solution was allowed to cool at 27° C. Excess ethanol was added to it for precipitation and kept for 12 hours. After complete precipitation of metal nanoparticle, the upper ethanol portion was decanted. The metal nanoparticle was washed with ethanol for 5 times by centrifuging at 12,000 rpm for 20 minutes each time. Then it was dried at open air and collected as a powder. This Pd NP powder can be dispersed in toluene or other nonpolar organic solvent. The particles are same as it was synthesized in toluene having 1-3 nm size.

Example 3

Preparation of Ruthenium Nanoparticle (Ru NP)

Ruthenium Chloride was used as a metal precursor to synthesis Ru NP. 0.010 gm $RuCl_3$ ($1\times10^{-2}$ M) and 0.053 gm Di-dodecyl dimethyl ammonium bromide (DDAB) (0.025 M) was taken in 5 mL degassed toluene. This mixture was stirred to dissolve the metal precursor in the organic solvent (toluene). Sodium borohydride solution (0.09 gm in 250 microlitres, 9.4 M) was added at a time when the whole metal precursor becomes soluble in toluene. Immediately the solution became dark black. This mixture was stirred for 30 minutes. Then 360 microlitre Di-dodecyl thiol was added as a capping agent, to the mixture and allowed to stir another 10 minutes. The ratio of metal and capping agent was 1:30. Then this mixture is refluxed at 80° C. for one hour. Now, this solution was allowed to cool at 26° C. Excess ethanol was added to it for precipitation. It was kept for 13 hours. After complete precipitation of metal nanoparticle, the upper ethanol portion was decanted. The metal nanoparticle was washed with ethanol for 4 times by centrifuging at 12,000 rpm for 20 minutes each time. Then dried at open air and collected as a powder. This Ru. NP powder can be dispersed in toluene or other nonpolar organic solvent. The particles are same as it was synthesized in toluene having 1-3 nm size.

Example 4

Preparation of Rhodium Nanoparticle (Rh NP)

Rhodium acetate dimer was used as a metal precursor to synthesis Rh NP. 0.022 gm $Rh_2(CH_3COO)_4$ ($1\times10^{-2}$ M) and 0.053 gm Di-dodecyl dimethyl ammonium bromide (DDAB) (0.025 M) was taken in 5 mL degassed toluene. This mixture was stirred to dissolve the metal precursor in the organic solvent (toluene). Generally this metal precursor was aqueous soluble. Sodium borohydride solution (0.09 gm in 250 microliter, 9.4 M) was added at a time when the whole metal precursor became soluble in toluene. Immediately the solution was turned brownish black from dark green color. This mixture was stirred for 30 minutes. Then 360 microlitre Di-dodecyl thiol was added as a capping agent, to the mixture and it is allowed to stir another 10 minutes. The ratio of metal and capping agent is 1:30. Then this mixture is refluxed at 80° C. for one hour. Now, this solution was allowed to cool at 25° C. Excess ethanol was added to it for precipitation. It was kept for 12 hours. After complete precipitation of metal nanoparticle, the upper ethanol portion was decanted. The metal nanoparticle was washed with ethanol for 4-5 times by centrifuging at 12,000 rpm for 20 minutes each time. Then it was dried at open air and collected as a powder. This Rh NP powder can be dispersed in toluene or other nonpolar organic solvent. The particles are same as it was synthesized in toluene having 1-3 nm size.

Example 5

Preparation of Worm Shaped Rhodium Nanoparticle (Rh NP)

Rhodium acetate dimer was used as a metal precursor to synthesis Rh NP. 5 mL toluene and 5 mL distilled water was taken as a reaction medium. 0.011 gm $Rh_2(CH_3COO)_4$ ($5\times10^{-3}$ M) is added to it. 60 microlitre di-dodecyl amine this is ligand (metal:ligand=1:10) was added to the mixture in a stirring condition. Immediately, the color of the solution changes from bluish green to pink color. It is stirred for 10 minutes. Then sodium borohydride solution (90 mg $NaBH_4$ in 5 mL ice-cold distilled water) is added in a dropwise manner. Slowly, the color of the solution was turned brownish black. Now the mixture is stirred vigorously for 1 hour. After that, this solution is poured in the separating funnel and shaken mildly and allowed to stand. After 15 minutes the lower aqueous portion is discarded. Again 15 mL distilled water is poured in the separating funnel to wash the organic medium. This organic solution is washed with distilled water for 3 times to discard extra borohydride. Now this organic mixture in refluxed at 120° C. for 45 minutes. Then 120 microlitre di-dodecyl thiol (Thiol was used as ligand as well as capping agent (metal:ligand=1:20) was added to the reaction mixture and refluxed again at 120° C. for 45 minutes. Now the solution was allowed to cool at 27° C. Excess ethanol was added to it for precipitation. It was kept for 14 hours. After complete precipitation of metal nanoparticle, the upper ethanol portion was decanted. The metal nanoparticle was washed with ethanol for 5 times by centrifuging at 12,000 rpm for 20 minutes each time. Then it was dried at open air and collected as a powder. This Rh NP powder can be dispersed in toluene or other nonpolar organic solvent. The particles are same as it was synthesized in toluene having 1-3 nm size.

Example 6

Preparation of Silver Nanorod (Ag NR)

Silver Nitrate was used as a metal precursor to synthesis Ag NR. 0.018 gm $AgNO_3$ ($1\times10^{-2}$ M) and 0.113 gm Di-dodecyl dimethyl ammonium bromide (DDAB) (0.025 M) was taken in 10 mL degassed toluene. This mixture was stirred to dissolve the metal precursor in the organic solvent (toluene). Sodium borohydride solution (0.18 gm in 400 microlitre, 9.4 M) was added at a time when the whole metal precursor became soluble in toluene. An immediate yellowish black color was appeared. This mixture was stirred for 3 hours. Then 720 microlitre Di-dodecyl thiol was added to the mixture and it was allowed to stir another 10 minutes. The ratio of metal and capping agent is 1:30. Then this mixture is refluxed at 80° C. for one hour. Now, this solution was allowed to cool at 25° C. Excess ethanol was added to it for precipitation. It was kept for 12 hours. After complete precipitation of metal nanoparticle, the upper ethanol portion was decanted. The metal nanoparticle is dispersed in toluene. The particles are same as it was synthesized in toluene having 1-3 nm size.

Example 7

Selective Hydrogenation by Using Pd-Nanoparticle Catalyst

| S. No. | Substrate | Pd-C(10%) catalyst | Pd-nanoparticle catalyst |
|---|---|---|---|
| 1 | (sugar derivative with OBn, alkyne, OH) | (sugar derivative with OH, alkane, OH) | (sugar derivative with OBn, alkane, OH) |
| 2 | (phenyl with OBn, alkyne) | (phenyl with OH, ethyl) | (phenyl with OBn, ethyl) |
| 3 | (steroid with HO, ethynyl) | (steroid with HO, ethyl) | (steroid with HO, vinyl) |
| 4 | (sugar derivative with OH, alkyne) | (sugar derivative with OH, alkane) | (sugar derivative with OH, alkene) |

ADVANTAGES OF THE INVENTION

This method provides ultra small sized nanoparticles with a very high yield. Even the nanoparticles can be obtained in powder form and again they can re-disperse in any non-polar solvent. These nanoparticles show very high and selective catalytic activity in hydrogenation reaction.

We claim:

1. A one-pot process for the synthesis of ultra-small, uniform-sized transition metal nanoparticles having size in a range of 1 to 3 nm and the said process consisting of:
   a) dissolving metal precursors and di-dodecyl dimethyl ammonium bromide (DDAB) as surfactant in 1:2.5 ratio in an organic solvent medium until complete dissolution;
   b) adding a reducing agent to the solution as obtained in (a);
   c) adding a capping agent in the solution as obtained in (b) with continuous stirring wherein the ratio of metal to the capping agent is in a range of 1:10 to 1:40 followed by refluxing at 80° C.;
   d) cooling the solution as obtained in (c) at temperature in a range of 27-32° C. followed by adding an anti-solvent to precipitate the ultra-small uniform-sized transition metal nanoparticles.

2. The one pot process according to claim 1, wherein the metal precursors used are selected from the group consisting of chlorides, bromides, nitrates, and acetates salts of transition metals selected from the group consisting of Platinum (Pt), Palladium (Pd), Rhodium (Rh), Iridium (Ir), Osmium (Os), Ruthenium (Ru), Silver (Ag), Gold (Au) and an alloy thereof.

3. The one pot process according to claim 1, wherein the metal precursor used is selected from the group consisting of Rhodium acetate-dimer, Palladium acetate, Platinum chloride, Ruthenium chloride, and Silver nitrate.

4. The one pot process according to claim 1, wherein the organic solvent medium comprises an organic solvent, optionally with water, where the organic solvent is selected from the group consisting of toluene, benzene, and chlorobenzene.

5. The one pot process according to claim 4, wherein the organic solvent is toluene.

6. The one pot process according to claim 1, wherein the reducing agent used is sodium borohydride.

7. The one pot process according to claim 1, wherein the capping agent used is di-dodecyl thiol.

8. The one pot process according to claim 1, wherein the anti-solvent used is selected from the group consisting of methanol, ethanol, isopropanol either alone or in combination thereof.

9. The one pot process according to claim 1, wherein the ultra-small uniform sized metal nanoparticles are in a form of nanorods.

10. The one pot process according to claim 1, wherein the ultra-small uniform sized metal nanoparticles exhibit catalytic activity, shape tunability and are useful in selective hydrogenation or reduction of large organic molecules.

11. The one pot process according to claim 1, wherein the anti-solvent used is ethanol.

* * * * *

UNITED STATES PATENT AND TRADEMARK OFFICE
CERTIFICATE OF CORRECTION

PATENT NO. : 10,052,692 B2
APPLICATION NO. : 14/420897
DATED : August 21, 2018
INVENTOR(S) : Bhagavatula et al.

Page 1 of 1

It is certified that error appears in the above-identified patent and that said Letters Patent is hereby corrected as shown below:

On the Title Page

Item (73), Assignee, Line 2, change "Dehli" to --Delhi--.

In the Specification

Column 1, Line 66, change "monodisprese" to --monodisperse--.

Column 2, Line 61, change "tunabillity." to --tunability.--.

Column 3, Line 60, change "tunabillity" to --tunability--.

Column 4, Line 56, change "tunabillity" to --tunability--.

Column 6, Line 1, change "tunabillity," to --tunability,--.

Column 6, Line 1, change "tunabillity" to --tunability--.

Column 6, Line 22 (approx.), change "tunabillity," to --tunability,--.

Column 7, Line 40, change "Ru. NP" to --Ru NP--.

In the Claims

Column 10, Line 42 (approx.), in Claim 4, change "benzene," to --benzene--.

Signed and Sealed this
Twenty-second Day of January, 2019

Andrei Iancu
*Director of the United States Patent and Trademark Office*